(12) United States Patent
Wang et al.

(10) Patent No.: US 10,860,632 B2
(45) Date of Patent: Dec. 8, 2020

(54) INFORMATION QUERY METHOD AND DEVICE

(71) Applicant: Alibaba Group Holding Limited, Grand Cayman (KY)

(72) Inventors: Jiexiong Wang, Guangdong (CN); Yang Yang, Guangdong (CN); Weijun Fu, Guangdong (CN); Yining Chen, Guangdong (CN)

(73) Assignee: Alibaba Group Holding Limited, Grand Cayman (KY)

( * ) Notice: Subject to any disclaimer, the term of this patent is extended or adjusted under 35 U.S.C. 154(b) by 183 days.

(21) Appl. No.: 15/550,591

(22) PCT Filed: Jan. 7, 2016

(86) PCT No.: PCT/CN2016/070332
§ 371 (c)(1),
(2) Date: Aug. 11, 2017

(87) PCT Pub. No.: WO2016/127740
PCT Pub. Date: Aug. 18, 2016

(65) Prior Publication Data
US 2018/0039692 A1 Feb. 8, 2018

(30) Foreign Application Priority Data

Feb. 13, 2015 (CN) .......................... 2015 1 0081199

(51) Int. Cl.
*G06F 16/00* (2019.01)
*G06F 16/33* (2019.01)
*G06F 16/28* (2019.01)
*G06F 16/242* (2019.01)
*G06F 16/332* (2019.01)

(52) U.S. Cl.
CPC ........ *G06F 16/3344* (2019.01); *G06F 16/243* (2019.01); *G06F 16/2445* (2019.01);
(Continued)

(58) Field of Classification Search
CPC ............... G06F 16/3344; G06F 16/243; G06F 16/2448; G06F 16/285; G06F 16/2445; G06F 16/3326; G06N 5/00
See application file for complete search history.

(56) References Cited

U.S. PATENT DOCUMENTS

2005/0289124 A1* 12/2005 Kaiser ............... G06F 16/24522
2006/0122993 A1*  6/2006 Dettinger .......... G06F 16/24549
(Continued)

FOREIGN PATENT DOCUMENTS

CN 102262634 11/2011
CN 102737049 10/2012
(Continued)

OTHER PUBLICATIONS

Binnig et al. "Reverse Query Processing", pp. 4-41 (Year: 2007).*
(Continued)

*Primary Examiner* — Mark D Featherstone
*Assistant Examiner* — Kweku William Halm
(74) *Attorney, Agent, or Firm* — Alston & Bird LLP

(57) ABSTRACT

An information query method and device. The method comprises: converting a query text in a natural language entered by a user, into a structured statement in an abstract query language; converting the statement in an abstract query language into a basic query statement or multiple iterated basic query statements (S200); and for a prepared database, performing query operations according to the basic query statement or the multiple iterated basic statements. Intentional analysis can be performed firstly on query texts in a natural language entered by a user to filter out a text requiring no query, a query text meeting the intention is converted into a statement in a abstract query language, then the statement in the abstract query language is converted into a basic query statement or multiple iterated basic query (Continued)

statements, most query intentions can be covered, complex logical and reasoning query can be achieved, and query results can be returned conveniently.

15 Claims, 6 Drawing Sheets

(52) U.S. Cl.
CPC ........ G06F 16/2448 (2019.01); G06F 16/285 (2019.01); G06F 16/3326 (2019.01)

(56) References Cited

U.S. PATENT DOCUMENTS

| | | | |
|---|---|---|---|
| 2006/0136407 A1* | 6/2006 | Dettinger | G06F 16/24526 |
| 2008/0016049 A1* | 1/2008 | Dettinger | G06F 16/243 |
| 2008/0249998 A1* | 10/2008 | Dettinger | G06F 16/243 |
| 2015/0295939 A1* | 10/2015 | Rissanen | G06F 21/62 726/1 |
| 2017/0116260 A1* | 4/2017 | Chattopadhyay | G06F 16/24522 |

FOREIGN PATENT DOCUMENTS

| | | |
|---|---|---|
| CN | 103646032 | 3/2014 |
| CN | 104636478 | 5/2015 |

OTHER PUBLICATIONS

International Search Report and Written Opinion for corresponding International Application No. PCT/CN2016/070332, dated Apr. 7, 2016, 11 pages.

* cited by examiner ps_pages/page_1.xml_12.png
INFORMATION QUERY METHOD AND DEVICE

CROSS-REFERENCE TO RELATED APPLICATION

The present invention claims priority to and benefit of the Chinese Patent Application No. 201510081199.X, filed with the State Intellectual Property Office (SIPO) of the People's Republic of China on Feb. 13, 2015, the entire content of which is incorporated by reference to the present application.

TECHNICAL FIELD

The present invention relates to the field of the Internet, and particularly relates to an information query method and device.

BACKGROUND ART

At present, people have increasingly higher requirements for the accuracy of informational queries. Oftentimes, people need to receive the most accurate answer for the requested query word.

However, in a practical application, a user's search request can also be very precise. The query words entered by the user may contain a number of precise intentions, which need the answer(s) to be returned directly in the query. For examples, when a user enters "the height of LIU Dehua," the answer "174 cm" needs to be returned; when a user enters "stars who are taller than 180 cm," the list of stars who meet this requirement for body height needs to be returned; and a user enters "the eight prose masters of the tang and song dynasties," "LIU Zongyuan" et al., need to be returned.

However, most of the traditional information query systems employ a layered architecture comprising a storage layer, an intermediate query layer and natural language parsing layer. In the prior art, the query language in the intermediate query layer is frequently very simple, which hence is unable to perform an accurate analysis and dissection on the request inputted by a user, accordingly, the result provided for the user's query is complex and not intuitive; alternatively, the query language in the intermediate query layer can be very complex; as a result, the natural language parsing layer may be unable to parse such complex query language; hence, it is not friendly to the natural language parsing layer, and is unable to provide a query result a user actually needs.

Therefore, a traditional information query system returns a query result by virtue of the matching degree obtained by comparing a user's query word with the texts of collected webpages may not meet a user's query intent, and hence is unable to return a query result that accurately meets the user's need.

Therefore, an information query method and device able to conveniently return the query result are needed.

SUMMARY OF THE INVENTION

The present invention intends to solve the technical problem of providing an information query method and device, which is able to convert an abstract query statement to a basic query statement or multiple iterated basic query statements, which are able to cover most of the query intensions, as well as achieve complex logic and reasoning query. In this way, the provided information query method is able to conveniently return a query result.

According to a first aspect of the present invention, the present invention provides an information query method, which comprises:

converting a query text in a natural language inputted by a user into a structured statement in an abstract query language;

converting the statement in the abstract query language into a basic query statement or multiple iterated basic query statements;

in a prepared database, executing a query operation according to the basic query statement or the multiple iterated basic statements.

In this way, the query text in a natural language inputted by a user is first subjected to an intentional analysis, which helps to filter out the text that do not need a query, and then convert the query text that is consistent with the intension to a statement in an abstract query language. Next, the obtained statement in an abstract query language is further converted to a basic query statement that is able to cover most of the query intentions; alternatively, the statement in an abstract query language may be converted to multiple iterated basic query statements. In addition, the basic query statement can be designed as a relatively simple query. For example, obtain a relatively clear (for example, a single) output on the basis of relatively limited number of (for example, one or two) inputs. Accordingly, the relation between the input and output is relatively close, or in other words, direct. Iteration is a type of activity in which a feedback process is repeated, so as to obtain a query target. One time of execution of a basic query statement is referred to as "iteration"; in addition, the result obtained from iteration will be next used as the input for the next iteration. In this way, a complex logic or reasoning query would be accomplished. In other words, a complex abstract query statement can be converted into the iteration of a plurality of simple basic query statements; and in each time of iteration, a direct output can be obtained on the basis of relatively small input. By way of a plurality times of iterations, a final query target can be reached from an original input. Due to the fact that most of the basic query statements are simple, they have low requirements on the database (storage layer). That is to say, they do not need a complex storage structure. As a result, this makes it possible to easily get a query result that is consistent with a user's intention and more accurate as well.

Preferably, the basic query statement may comprise:

an entity information query statement, which is used for querying the information related to a designated entity;

an entity attribute query statement, which is used for querying a designated attribute of a designated entity;

an entity reverse query statement, which is used for reversely querying a corresponding entity according to a designated attribute filtering condition and a designated category;

a related entity query statement, which is used for querying an entity that has a designated relationship with a designated entity;

an entity relational query statement, which is used for querying a relationship between two designated entities.

In this way, a variety of different types of basic query statement can be preset. Subsequently, according to the received statement in an abstract query language, the corresponding type of basic query statement can be obtained in a parsing process. Next, this type of basic query statement will be used in the following query operation. Various types of basic query statements are able to meet a user's requirements for querying accurately with different query statements. In addition, there will be a direct association between the input and output of a basic query statement. As a result, a query object thereof can be easily accomplished from a database or a webpage.

Preferably, the database comprises: an entity database, an entry for an entity in the entity database comprising an entity data field and a variable attribute field, wherein the entity data field stores the entity data representing an entity, and the variable attribute field stores the entity attribute data describing an entity's attribute; and a relational database, each entry in the relational database comprising two nodes and edge information, wherein the two nodes respectively store two entity data representing two entities, and the edge information stores the entity relational data of two entities.

Thus, the storage structure of a database can be configured according to the relation between the input data and output data of a basic query statement, which helps to execute the basic query statement in an easier and quicker way. In addition, respective indexes can be established in the database for the entity data field, variable attribute field, as well as the two nodes and the edge information, which facilitate further improving the efficiency of a query.

Preferably, in the step of executing the query operating, an entry for an entity in the entity database further comprises a meta-information field, the meta-information field stores the meta-information related to the entity, and the meta-information refers to the information distinguishing the entity from other entities.

In the process of executing a query operation, the entity data is determined on the basis of the meta-information.

Thus, the meta-information, as the core information data in an entity data, is able to distinguish various entities and entity data, especially distinguish the different entities share the same entity name. In this way, when performing an entity query, the information related to the entity can be obtained accurately, which can avoid inclusion of the information irrelevant to the entity in query, which may result in an issue of fuzzy query.

Preferably, the database further comprises a category database, and the category database correspondingly stores a plurality of entity category data and category tags, the plurality of entity category data are divided into a plurality of levels, the entity category data in a low level subordinate to the entity category data associated therewith in a higher level.

In the entity database, the meta-information field of the entry stores a category tag corresponding to an entity category data for describing a category of the entity;

when executing a query operation according to the entity reverse query statement, retrieving in the entity database for the entity data satisfying the following conditions:

the category tag is a category tag corresponding to the entity category data representing a designated category or a category tag corresponding to the entity category data subordinating to a designated category; and the corresponding entity attribute data satisfying the designated attribute filtering condition.

Thus, by way of identifying the category tag and satisfying the attribute filtering condition, a reverse query operation for determining entity data can be accomplished.

Preferably, the category database stores, in association with each entity category data, an entity attribute defined by the entity category represented by the entity category data.

In addition, the step of executing the query operation according to the entity reverse query statement comprises:

under the condition that the designated attribute related to the designated attribute filtering condition belongs to the entity attribute defined by the designated category, executing, for the entity database, the query operation according to the entity reverse query statement.

In this way, a determination condition has been set up between the filtering condition and the entity category data, which is able to avoid executing unnecessary or inappropriate query operations. As a result, the query becomes more specific and more accurate.

According to a second aspect of the present invention, the present invention provides an information query device, which comprises:

a first conversion device, which is used for converting a query text in a natural language inputted by a user into a structured statement in an abstract query language;

a second conversion device, which is used for converting the statement in the abstract query language into a basic query statement or multiple iterated basic query statements;

a query device, which is used for executing a query operation according to the basic query statement or the multiple iterated basic statements in a prepared database.

Preferably, the query device comprises:

an entity information query device, which is used for executing an entity information query statement, so as to query the information related to a designated entity;

an entity attribute query device, which is used for executing an entity attribute query statement, so as to query a designated attribute of a designated entity;

an entity reverse query device, which is used for executing an entity reverse query statement, so as to reversely query a corresponding entity according to a designated attribute filtering condition and a designated category;

a related entity query device, which is used for executing a related entity query statement, so as to query an entity that has a designated relationship with a designated entity; and an entity relational query device, which is used for executing an entity relational query statement, so as to query a relationship between two designated entities.

Preferably, the database comprises:

an entity database, an entry for an entity in the entity database comprising an entity data field and a variable attribute field, wherein the entity data field stores the entity data representing an entity, and the variable attribute field stores the entity attribute data describing an entity's attribute; the meta-information field stores the meta-information related to the entity, and the meta-information refers to the information distinguishing the entity from other entities, and the query device determines the entity information on the basis of the meta-information;

a relational database, each entry in the relational database comprising two nodes and edge information, wherein the two nodes respectively store two entity data representing two entities, and the edge information stores the entity relational data representing a relation between the two entities; and the database further comprises a category database, and the category database correspondingly stores a plurality of entity category data and category tags, the plurality of entity category data are divided into a plurality of levels, the entity category data in a low level subordinate to the entity category data associated therewith in a higher level.

In the entity database, the meta-information field of the entry stores a category tag corresponding to an entity category data for describing an category of the entity, wherein, the entity reverse query device retrieves in the entity database for the entity data satisfying the following conditions:

the category tag is a category tag corresponding to the entity category data representing a designated category or a category tag corresponding to the entity category data subordinating to a designated category; and the corresponding entity attribute data satisfying the designated attribute filtering condition.

Preferably, the category database stores, in association with each entity category data, an entity attribute defined by the entity category represented by the entity category data.

In addition, the entity reverse query device executing, for the entity database, the query operation according to the entity reverse query statement, under the condition that the designated attribute related to the designated attribute filtering condition belongs to the entity attribute defined by the designated category.

According to a third aspect of the present invention, the present invention provides an information query method, which comprises:

performing an intentional analysis on a query text in a natural language inputted by a user, which is then converted into a structured query statement;

converting the query statement into a basic query statement or multiple iterated basic query statements;

in a prepared database, executing a query operation according to the basic query statement or the multiple iterated basic statements, so as to determine the feature information of an entity corresponding to the query text in the natural language.

In reference to the third aspect of the present invention, the examples of the present invention further provide a first embodiment of the third aspect of the present invention, wherein the step of performing an intentional analysis on a query text in a natural language inputted by a user, which is then converted into a structured query statement comprises:

performing an intentional analysis on the query text in the natural language to determine a query intention of the query text in the natural language;

removing a text content that is not consistent with the query intention from the query text in the natural language;

converting the query text in the natural language following the removing step into the structured statement in the structured query statement.

In reference to the third aspect of the present invention, the examples of the present invention further provide a second embodiment of the third aspect of the present invention, wherein, the step of in a prepared database, executing a query operation according to the basic query statement or the multiple iterated basic statements comprises:

in the prepared database, querying a designated attribute of a designated entity; or in the prepared database, querying the information related to a designated entity; or in the prepared database, reversely querying a corresponding entity according to a designated attribute filtering condition and a designated category; or in the prepared database, querying an entity that has a designated relation with a designated entity; or in the prepared database, querying a relationship between two designated entities.

In reference to the third aspect of the present invention, the examples of the present invention further provide a third embodiment of the third aspect of the present invention, wherein, the step of in a prepared database, executing a query operation according to the basic query statement or the multiple iterated basic statements comprises:

in the entity database, using the basic query statement to query an entity data field and/or a variable attribute field, wherein the entity data field stores the entity data representing an entity, and the variable attribute field stores the entity attribute data describing an entity's attribute; and in the relational database, using the basic query statement to query an entry, wherein each entry comprises two nodes and edge information, wherein the two nodes respectively store two entity data representing two entities, and the edge information stores the entity relational data of two entities.

In reference to the third aspect of the present invention, the examples of the present invention further provide a fourth embodiment of the third aspect of the present invention, wherein, the step of in the entity database, using the basic query statement to query an entity data field and/or a variable attribute field comprises:

in the entity database, using the basic query statement to query a meta-information field, wherein the meta-information field stores the meta-information related to the entity, and the meta-information refers to the information distinguishing the entity from other entities.

In reference to the third aspect of the present invention, the examples of the present invention further provide a fifth embodiment of the third aspect of the present invention, wherein the step of in the prepared database, executing a query operation according to the basic query statement or the multiple iterated basic statements further comprises:

in the category database, using the basic query statement to query a plurality of entity category data and category tags, the plurality of entity category data are divided into a plurality of levels, the entity category data in a low level subordinate to the entity category data associated therewith in a higher level;

in the entity database, querying the meta-information field in an entry for the entity, wherein the meta-information field stores a category tag corresponding to the entity category data describing the category of the entity.

In reference to the third aspect of the present invention, the examples of the present invention further provide a sixth embodiment of the third aspect of the present invention, wherein the step of in the prepared database, reversely querying a corresponding entity according to a designated attribute filtering condition and a designated category comprises:

querying the category tag that is the entity category data representing the designated category, or querying the category tag corresponding to the entity category data subordinating to a designated category; the corresponding entity attribute data satisfying the designated attribute filtering condition.

In reference to the third aspect of the present invention, the examples of the present invention further provide a seventh embodiment of the third aspect of the present invention, wherein the information query method further comprises:

under the condition that the designated attribute related to the designated attribute filtering condition is an entity attribute defined by the designated category, executing, in the entity database, reversely querying a corresponding entity according to the designated attribute filtering condition and the designated category.

According to a fourth aspect of the present invention, the present invention provides an information query device, which comprises:

a first conversion module, which is used for performing an intentional analysis on a query text in a natural language inputted by a user, which is then converted into a structured query statement;

a second conversion module, which is used for converting the query statement into a basic query statement or multiple iterated basic query statements;

a query module, which is used in a prepared database, executing a query operation according to the basic query statement or the multiple iterated basic statements, so as to determine the feature information of an entity corresponding to the query text in the natural language.

Thus, the query text in a natural language inputted by a user is first subjected to an intentional analysis, which helps to filter out the text that do not need a query, and then convert the query text that is consistent with the intension to a statement in an abstract query language. Next, the obtained statement in an abstract query language is further converted to a basic query statement that is able to cover most of the query intentions; alternatively, the statement in an abstract query language may be converted to multiple iterated basic query statements. In addition, the basic query statement can be designed as a relatively simple query. For example, obtain a relatively clear (for example, a single) output on the basis of relatively limited number of (for example, one or two) inputs. Accordingly, the relation between the input and output is relatively close, or in other words, direct. Iteration is a type of activity in which a feedback process is repeated, so as to obtain a query target. One time of execution of a basic query statement is referred to as "iteration"; in addition, the result obtained from iteration will be next used as the input for the next iteration. In this way, a complex logic or reasoning query would be accomplished. In other words, a complex abstract query statement can be converted into the iteration of a plurality of simple basic query statements; and in each time of iteration, a direct output can be obtained on the basis of relatively small input. By way of a plurality times of iterations, a final query target can be reached from an original input. Due to the fact that most of the basic query statements are simple, they have low requirements on the database (storage layer). That is to say, they do not need a complex storage structure. As a result, this makes it possible to easily get a query result that is consistent with a user's intention and more accurate as well.

BRIEF DESCRIPTION OF THE DRAWINGS

In reference to the accompanying drawings, the exemplary embodiments of the present disclosure will be described in more detail. The above and other objects, features and advantages of the present disclosure will become more apparent, wherein, in the exemplary embodiments of the present disclosure, the same reference numerals refer to the same part or element.

DESCRIPTION OF THE EMBODIMENTS

Certain preferred embodiments of the present disclosure will be described in more detail below with reference to the accompanying drawings. While the preferred embodiments of the present disclosure are shown in the respective drawings, it should be understood that the present disclosure may be achieved in various forms and should not be limited to the embodiments set forth herein. Rather, these embodiments are provided in order to make the disclosure more thorough and complete, and to fully convey the scope of the present application to those skilled in the art.

Figure 1:
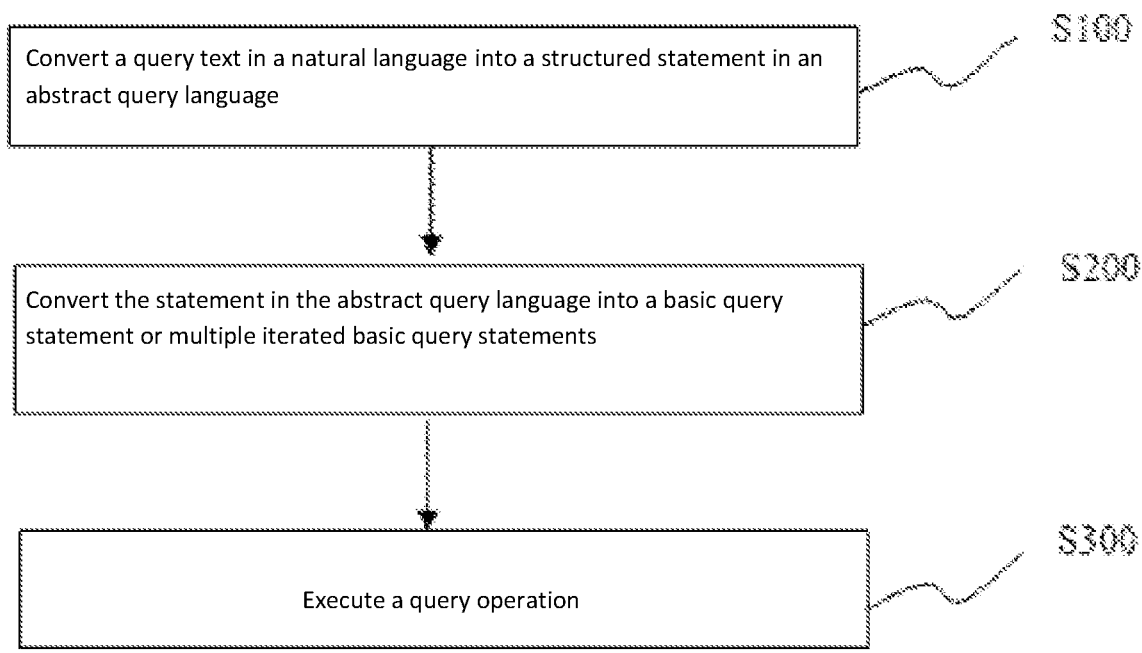
FIG. 1 is a schematic view of a flow chart of the information query method according to one embodiment of the present invention.

FIG. 1 is a schematic view of a flow chart of the information query method according to one embodiment of the present invention.

First, in step S100, a query text in a natural language entered by a user is converted into a structured statement in an abstract query language The query text in a natural language entered by a user mentioned above includes a related content about the person or event to be queried which is entered into a search engine, wherein the related content can be a few words, phrases, and the like, or it can be a sentence with more detailed description.

In step S100, more specifically, the query text in a natural language inputted by a user is first subjected to an intentional analysis, which helps to filter out the query word that does not have a query intention, and then the query word consistent with the query intention is parsed accordingly to obtain its query type, and at the same time, a structured query string is formed accordingly. As a result, the query text in a natural language is converted to a query statement in an abstract query language.

Next, in step S200, the query statement in an abstract query language is further converted to a basic query statement or multiple iterated basic query statements.

In step S200, the abstract query statement obtained in step S100 is further converted to a basic query statement or multiple iterated basic query statements. In this process, the basic query statement is able to achieve the query target through a plurality of iterations, which is able to most of the query intentions. That is to say, each iteration is able to retrieve one designated attribute of the target. Accordingly, by way of determining various attributes of the target, the query target can be more accurately determined. It is noted that iteration is a type of activity in which a feedback process is repeated, which is aimed at eventually achieve a relatively complex query target by way of a plurality of relatively simple query steps. Each time when the process is repeated once, it will be referred to as one "iteration"; while the result obtained from iteration will be next used as the input for the next iteration. In this way, a complex logic or reasoning query would be accomplished. In other words, a complex abstract query statement can be converted into the iteration of a plurality of simple basic query statements; and in each time of iteration, a direct output can be obtained on the basis of relatively small input. By way of a plurality times of iterations, a final query target can be reached from an original input.

Due to the fact that most of the basic query statements are simple, they have low requirements on the database (storage layer). That is to say, they do not need a complex storage structure; in other words, a query task can be finished without employing a complex query approach. As a result, this makes it possible to easily get a query result that is consistent with a user's intention and more accurate as well.

Thus, in step S300, in a prepared database, execute the query operation according to the basic query statement or the multiple iterated basic statements and get a query result.

By way of the method shown in FIG. 1, the present invention is able to get a query result that is consistent with a user's intention and more accurate as well.

In step S200, the conversion from the statement in the abstract query language into a basic query statement or multiple iterated basic query statements; is able to cover most of the query intensions, as well as achieve complex logic and reasoning query.

A number of different types of basic query statements will be described next.

An entity information query statement can be used for querying the information related to a designated entity. For example, it can be used to query the entire attribute information of a designated entity.

In the present invention, the entity information can be identified from an abstract query statement, and then the information related to the entity can be queried. For example, an entity information query statement can be recorded as EE (entity information), while the identified entity information is "LIU Dehua," accordingly, it can be represented by EE (LIU Dehua), and the query operation result of the information related to LIU Dehua will be returned.

An entity attribute query statement can be used to query a designated attribute of a designated entity.

For example, an entity information query statement can be recorded as EAA (entity information, attribute name); while what has been identified is "the height of LIU Dehua," which can be represented by EAA (LIU Dehua, height). The query operation result of the height of LIU Dehua will be returned.

An entity reverse query statement can be used for reversely querying a corresponding entity according to a designated attribute filtering condition and a designated category.

In this case, the filtering condition and category of a designated attribute can be identified from an abstract query statement, which are then used in a reverse query to query an entity that meets the identified filtering condition and category. For example, an entity reverse query statement can be recorded as ATE (filtering condition and designated category of a designated attribute), while what has been identified is "a singer whose height is greater than 180 cm," which can be represented by ATE (height>180 cm, singer). The query operation result of the list of singers who meet the condition will be returned.

A related entity query statement can be used for querying an entity that has a designated relationship with a designated entity.

In this case, an entity and a designated relation can be identified from an abstract query statement, which are then used to query another entity that has the designated relation with the entity. For example, a related entity query statement may be recorded as ERE (entity name, name of the designated relation), while what is identified is "LIU Dehu's wife," which can be represented by ERE (LIU Dehu, wife). The query operation result of ZHU Liqian (LIU Dehu's wife) will be returned.

An entity relational query statement can be used for querying a relationship between two designated entities.

In this case, two specific entities can be identified from an abstract query statement, which are then used to query a relation between the two entities. For example, an entity relational query statement can be recorded as EER (entity name 1, entity name 2), while what is identified is "what is the relation between LIU Dehua and LIANG Chaowei," which can be represented by EER (LIU Dehu, LIANG Chaowei). The query operation result of a list of the relations between LIU Dehu and LIANG Chaowei will be returned.

On the other hand, it is noted that there is no such a specific sequence or order in which the foregoing types of basic query statements can be executed; rather, the type of basic query statement to be executed is determined by the key words identified from the abstract query statement. Of course, the foregoing types of basic query statements can be executed in an iterated way. For example, in the case when what is identified is "the height of LIU Dehua's wife," which can be represented by EAA (ERE (LIU Dehua, wife), height), the query operation result of the height of ZHU Liqian will be returned.

Of course, the sub-statements of basic query statement are not limited to the types of basic query statements listed herein; on the other hand, the iterated executions of the various types of basic query statements are not limited to the iteration manner described above. Other types of basic query statements and iterated executions that meet other logic query relation can also be used in the present application.

Figure 2:
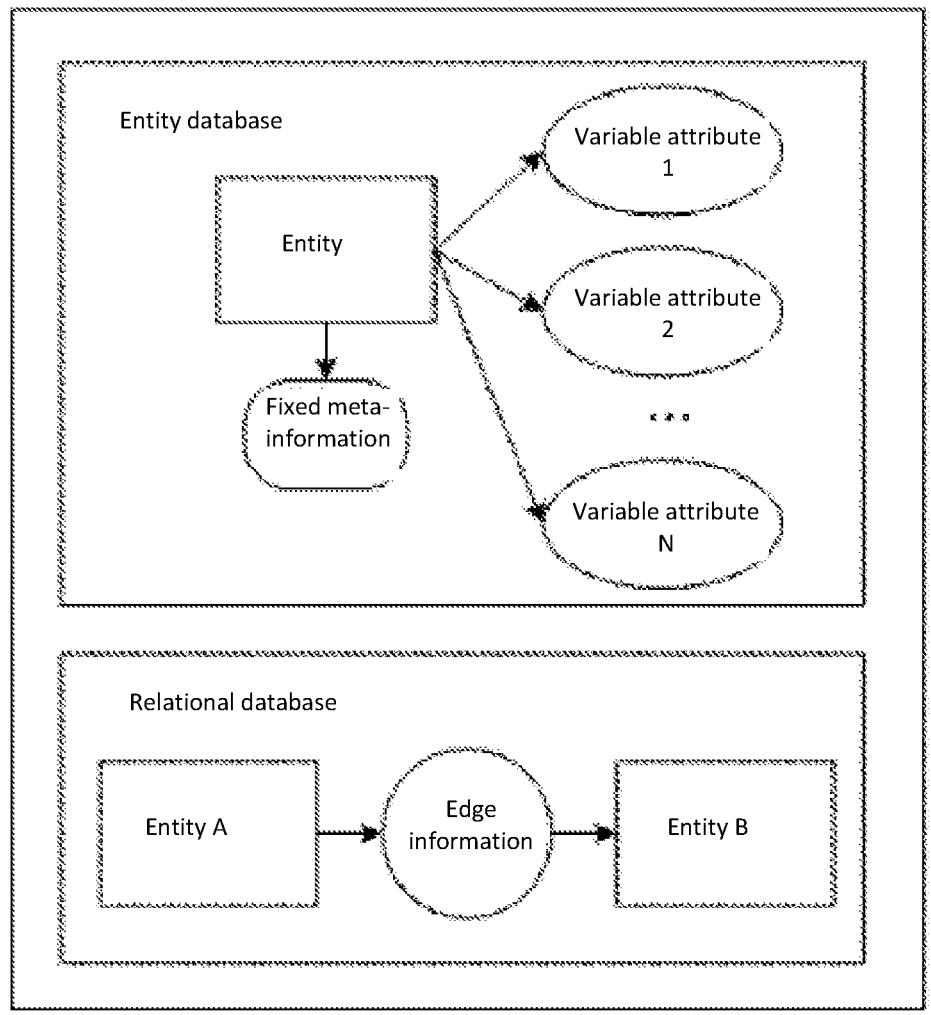
FIG. 2 is a database structure that may be used in the information query method according to the present invention.

FIG. 2 is a database structure that may be used in the information query method according to the present invention.

The structure of a database can be divided into at least two parts, namely an entity data database (entity database) and relation data database (relational database).

An entry for an entity in the entity database comprising an entity data field and a variable attribute field, wherein the entity data field stores the entity data representing an entity, and the variable attribute field stores the entity attribute data describing an entity's attribute.

Herein, an entity database can be used in an execution of a query operation according to an entity information query statement and an entity attribute query statement. In addition, respective indexes can be established in the entity database for variable attribute field, which facilitate further improving the efficiency of a query.

In addition, in a relational database, each entry in the relational database comprising two nodes and edge information, wherein the two nodes respectively store two entity data representing two entities, and the edge information stores the entity relational data of two entities. In some embodiments of the present invention, the two nodes mentioned above can be further distinguished as one entry node and one exit node, which are used to store an entity A and an entity B, respectively, and in such a case, the edge information stores the directional relation data.

In the present invention, a relational database can be used in an execution of a query operation according to an entity relation query statement and a related entity query statement. On the other hand, respective indexes can be established in the relational database for nodes and edge information, which facilitate further improving the efficiency of a query.

Further, an entry for an entity in the entity database further comprises a meta-information field, the meta-information field stores the meta-information related to the entity, and the meta-information refers to the information distinguishing the entity from other entities. Meta-information may also be referred to as "meta-data," which are the data for describing other data; that is to say, meta-data are the descriptive information for data and information resource.

In the process of executing a query operation, the entity data is determined on the basis of the meta-information.

Thus, for a basic query statement, first the entity data can be determined according to the meta-information in a meta-information field, wherein each meta-information is associated with an entity data. In this way, various entities and various entity data are distinguished from each other by virtue of the meta-information. Hence, when performing an entity query, the information related to the entity can be obtained accurately. It can avoid an inclusion of the information irrelevant to the entity in the query, which may result in an issue of fuzzy query. It is particularly useful when distinguishing different entities sharing the same entity name. For example, a number of different people (entity) may have the same name "LIU Dehua" (entity data). In such a case, these different people can be distinguished on the basis of their different personal meta-information, so as to obtain the personal information of each person (entity attribute data).

Figure 3:
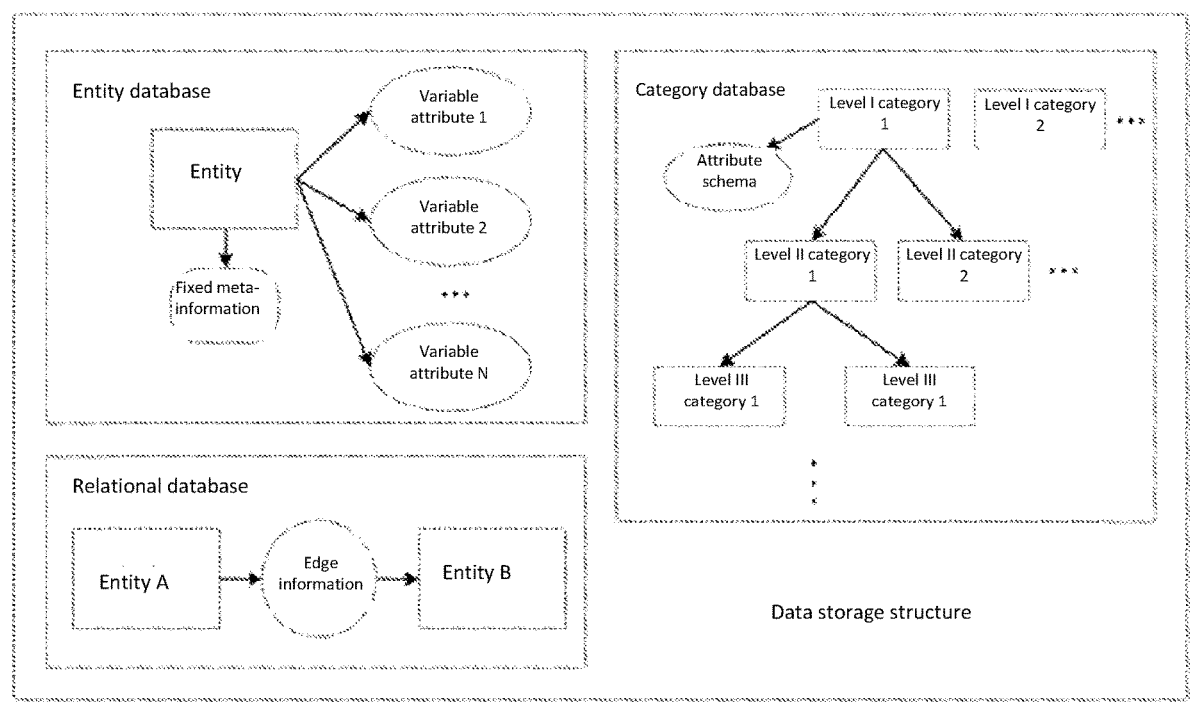
FIG. 3 is an improved database structure that may be used in the information query method according to the present invention.

FIG. 3 is an improved database structure that may be used in the information query method according to the present invention.

As shown in FIG. 3, in addition to the entity database and relational database, a database may further comprise a category data database (category database).

In a category database, the category database correspondingly stores a plurality of entity category data and category tags, the plurality of entity category data are divided into a plurality of levels (first level category 1, first level category 2 . . . second level category 1, second level category 2 . . . third level category 1, third level category 2 . . . ) In addition, the entity category data in a low level subordinate to the entity category data associated therewith in a higher level.

In the entity database, the meta-information field of the entry stores a category tag corresponding to an entity category data for describing a category of the entity.

When executing a query operation according to the entity reverse query statement, retrieving in the entity database for the entity data satisfying the following conditions:

the category tag is a category tag corresponding to the entity category data representing a designated category or a category tag corresponding to the entity category data subordinating to a designated category; and the corresponding entity attribute data satisfying the designated attribute filtering condition.

For example, when executing a query operation of "singers whose height is greater than 180 cm," assuming in the category database, the word "singer" corresponds to the entity category data, for example, a second level category, which subordinates to a first level category "Entertainment Star," and the third level categories "Mainland singer," "Hong Kong singer," "Taiwan singer" subordinate to the second level category "singer."

From the category database, the category tag tab-II corresponding to the second level category "singer" and the category tags tab-III1, tab-III2, and tab-III3 which correspond respectively to the third level categories "Mainland singer," "Hong Kong singer" and "Taiwan singer" can be obtained.

Subsequently, the respective category tags storied in the meta-information fields can be retrieved from the entity database. The corresponding entity data can be identified for the category tags storied in the meta-information, tab-II, tab-III1, tab-III2 and tab-III3.

Next, search the variable attribute date corresponding to the entity data retrieved according to the foregoing category tags to find the entity data in which the attribute data related to height cab satisfy the condition "greater than 180 cm."

In this way, the "singer(s) whose height is greater than 180 cm" can be reversely retrieved from the database.

Moreover, as shown in FIG. 3, the category database stores, in association with each entity category data, an entity attribute defined by the entity category represented by the entity category data. It is noted that FIG. 3 only shows the respective attributes corresponding to the entity categories in first level category 1. However, in fact a corresponding attribute can be established for each one of (or a plurality of) entity category data (each category).

In addition, the step of executing the query operation according to the entity reverse query statement comprises:

under the condition that the designated attribute related to the designated attribute filtering condition is the entity attribute defined by the designated category, executing, for the entity database, the query operation according to the entity reverse query statement.

In the foregoing case, a determination condition has been set up between the designated attribute filtering condition and the entity category data. In addition, in the case when the designated attribute related to the designated attribute filtering condition is an entity attribute defined by the designated category, a query operation of reverse query statement will be performed with the entity database. As a result, the present invention is able to avoid executing any unnecessary or inappropriate query operations, which makes a query more specific and more accurate.

For example, in the foregoing case of "singer whose height is greater than 180 cm," the designated attribute filtering condition "height is greater than 180 cm" related to the designated attribute "height," which is an entity attribute defined by the designated category "singer." Accordingly, a query operation of reverse query statement will be performed with the entity database. However, in this case, if the designated attribute filtering condition has been changed from "height is greater than 180 cm" to "occupying area is greater than 100 square meters," the related designated attribute "occupying area" is not an entity attribute defined by the designated category "singer." As a result, the database is not going to execute the query operation of reverse query statement.

In reference to FIGS. 1 to 3, the information query method according to the present invention has been described in detail. Next, the information query device according to the present invention will be further described.

Many functional analyses for the devices to be described next are similar to that for the function described in the foregoing method steps in reference to FIGS. 1 to 3. Accordingly, in order to avoid an unnecessary repeat, the following description will focus on the structure of the information query device without providing description for the details described previously. So, for their descriptions, please refer to the related description provided above.

Figure 4:
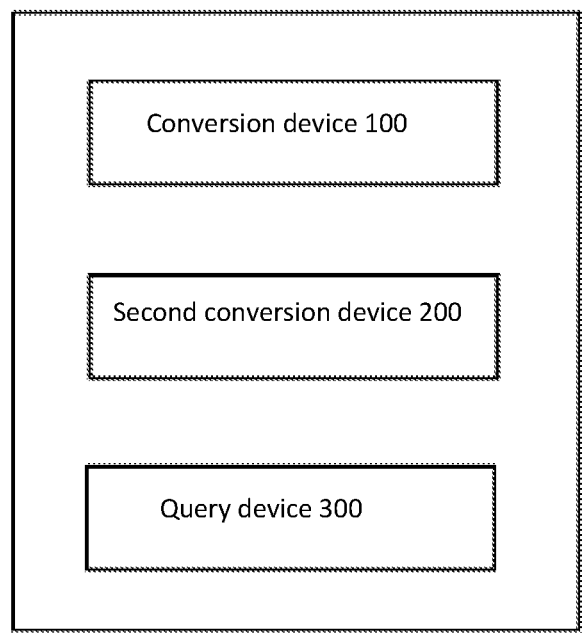
FIG. 4 is a schematic view of a block diagram of the information query device according to one embodiment of the present invention.

FIG. 4 is a schematic view of a block diagram of the information query device according to one embodiment of the present invention.

As shown in FIG. 4, the information query device according to the present invention comprises:

a first conversion device 100, which is used for converting a query text in a natural language inputted by a user into a structured statement in an abstract query language;

a second conversion device 200, which is used for converting the statement in the abstract query language into a basic query statement or multiple iterated basic query statements; and a query device 300, which is used for executing a query operation according to the basic query statement or the multiple iterated basic statements in a prepared database.

With the information query device shown in FIG. 4, the present invention is able to cover most of the query intensions, as well as achieve complex logic and reasoning query. In this way, the provided information device can conveniently provide the query result that is more accurate and more consistent with a user's query intention.

Figure 5:
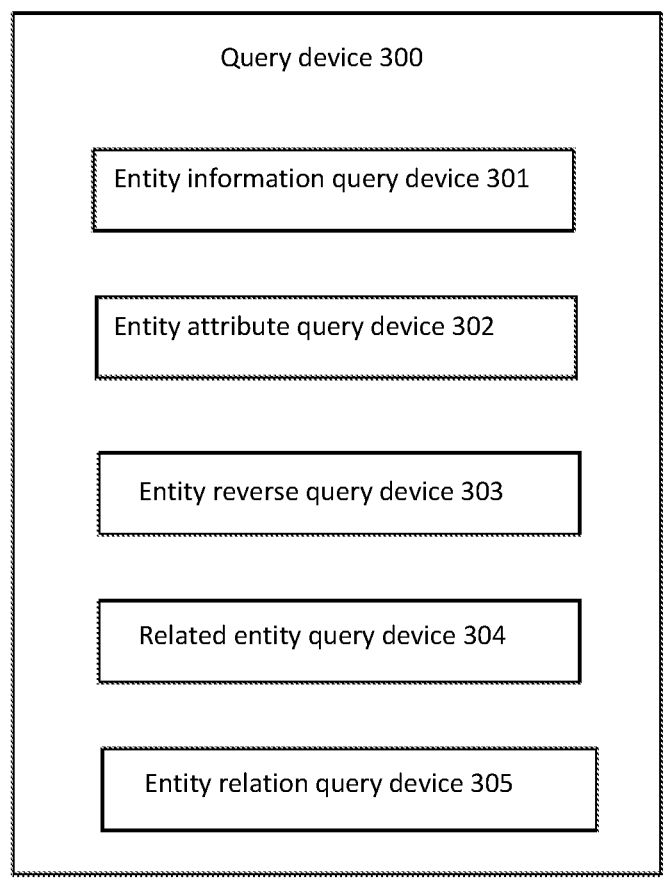
FIG. 5 is a schematic view of a block diagram of an optional internal structure of the information query device shown in FIG. 4.

FIG. 5 is a schematic view of a block diagram of an optional internal structure of the information query device 300 shown in FIG. 4.

As shown in FIG. 5, the query device according to the present invention comprises:

an entity information query device 310, which is used for executing an entity information query statement, so as to query the information related to a designated entity;

an entity attribute query device 320, which is used for executing an entity attribute query statement, so as to query a designated attribute of a designated entity;

an entity reverse query device 330, which is used for executing an entity reverse query statement, so as to reversely query a corresponding entity according to a designated attribute filtering condition and a designated category;

a related entity query device 340, which is used for executing a related entity query statement, so as to query an entity that has a designated relationship with a designated entity; and an entity relational query device 350, which is used for executing an entity relational query statement, so as to query a relationship between two designated entities.

By way of executing various query statements with different query devices, the present invention is able to achieve diverse query operations with various selections.

As mentioned above, the database that can be used by the information query devices of the present invention comprises: an entity database and a relational database:

an entity database, an entry for an entity in the entity database comprising an entity data field and a variable attribute field, wherein the entity data field stores the entity data representing an entity, and the variable attribute field stores the entity attribute data describing an entity's attribute; the meta-information field stores the meta-information related to the entity, and the meta-information refers to the information distinguishing the entity from other entities, and the query device determines the entity information on the basis of the meta-information;

a relational database, each entry in the relational database comprising two nodes and edge information, wherein the two nodes respectively store two entity data representing two entities, and the edge information stores the entity relational data representing a relation between the two entities; and the database further comprises a category database, and the category database correspondingly stores a plurality of entity category data and category tags, the plurality of entity category data are divided into a plurality of levels, the entity category data in a low level subordinate to the entity category data associated therewith in a higher level;

in the entity database, the meta-information field of the entry stores a category tag corresponding to an entity category data for describing an category of the entity, wherein, the entity reverse query device retrieves in the entity database for the entity data satisfying the following conditions:

the category tag is a category tag corresponding to the entity category data representing a designated category or a category tag corresponding to the entity category data subordinating to a designated category; and the corresponding entity attribute data satisfying the designated attribute filtering condition.

In the present invention, the database can comprise one or more of the entity database, the relational database and the category database, which work together with the information query device to accomplish one or a few query operations. As for the query operation, it can be a query for entity information, a query for entity attribute, an entity reverse query, a query for related entity, a query for entity relation and the like. Please refer to the detailed description provided above for the corresponding query procedures.

Moreover, the category database stores, in association with each entity category data, an entity attribute defined by the entity category represented by the entity category data.

In addition, the entity reverse query device executing, for the entity database, the query operation according to the entity reverse query statement, under the condition that the designated attribute related to the designated attribute filtering condition belongs to the entity attribute defined by the designated category.

In the present invention, a determination condition has been set up between the entity reverse query device and the category database. As a result, the present invention is able to avoid executing any unnecessary or inappropriate query operations, which makes a query more specific and more accurate. Please refer to the detailed description provided above for the corresponding query procedures.

Figure 6:
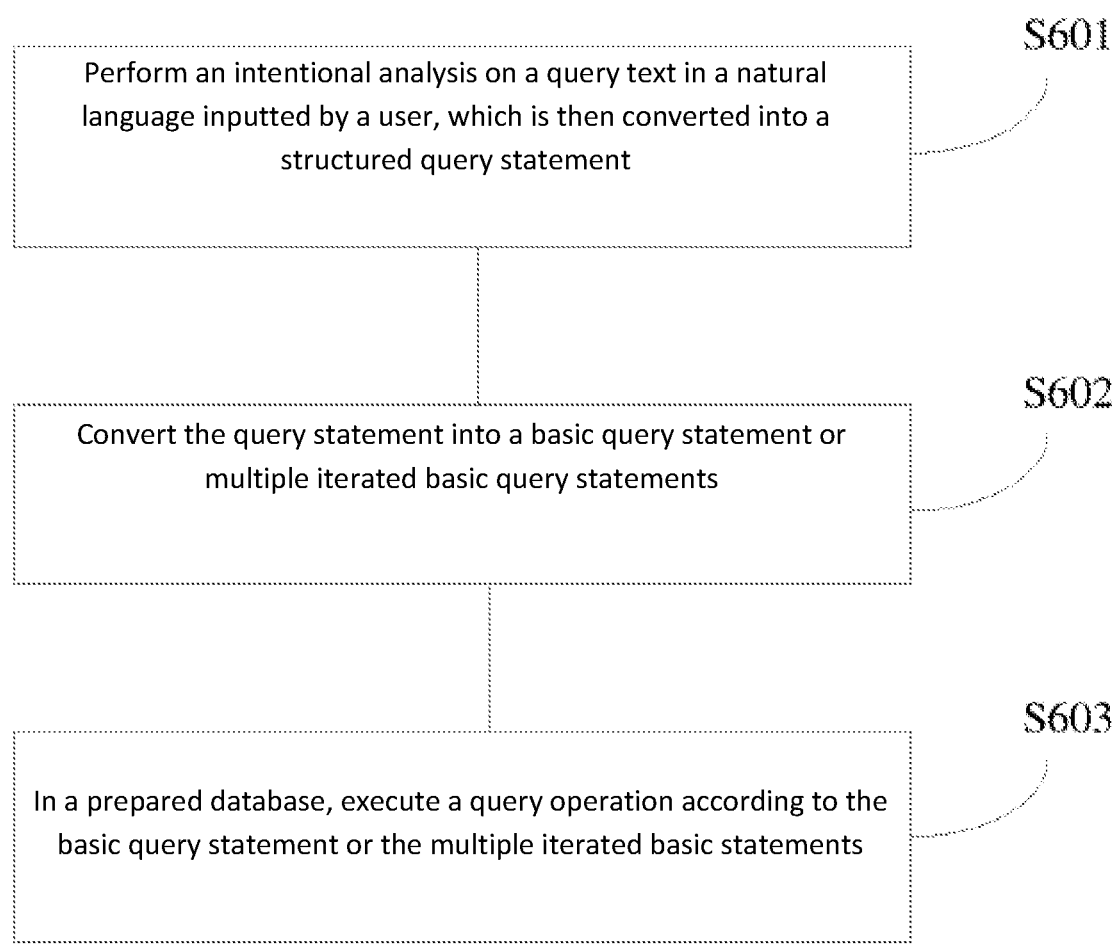
FIG. 6 is a basic flow chart provided by the information query method according to the present invention.

One example of the embodiments of the present invention also provides an information query method, as shown in FIG. 6, the information query method comprises the following steps:

S601, performing an intentional analysis on a query text in a natural language inputted by a user, which is then converted into a structured query statement;

S602, converting the query statement into a basic query statement or multiple iterated basic query statements;

S603, in a prepared database, executing a query operation according to the basic query statement or the multiple iterated basic statements, so as to determine the feature information of an entity corresponding to the query text in the natural language.

In step S601, an intentional analysis needs to be conducted on the query text in a natural language inputted by a user. The purpose of conducting such intentional analysis is to determine the query result desired by the query text in a natural language inputted by a user. IN the case when a user is using a type of natural language to communicate, or sending a statement to a network terminal by way of inputting a natural language, the statement typically, different from a computer program code, does not only contain effective information; instead, a large quantity of connection words, repeating modifying expression and other types of words without significant meanings are included in such statement. However, these words have no any value for a computer to execute the query steps. In addition, these words may even make a computer to identify certain incorrect meanings. As a result, prior to determining the key words to be used in the query, an intentional analysis has to be carried out to remove those words without values in a query from the query text in a natural language inputted by a user; in other words, these words need to be filtered out, so as to obtain a structured query statement. The obtained structured query statement is actually similar to the query code used by a computer. Typically, a structured query statement only contains the effective identification words, wherein the entity characteristic information can be deemed as the meta-information described in the previous examples.

Next, step S602 is further executed, in which the structured query statement obtained following the intentional analysis and filtering process is further converted into one or a plurality of basic query statement. In this step, one of the most important processes is the "words dividing" treatment to a complete structured query statement obtained. That is to say, a complete statement is divided, wherein each word (i.e., basic query statement) obtained from words dividing process can independent function as an identification word. Subsequently, on the basis of these identification words and a pre-determined computer coding manner, the basic query statement can be obtained via an editing process or a conversion process.

More specifically, in step S601, the step of performing an intentional analysis on a query text in a natural language inputted by a user, which is then converted into a structured query statement comprises the following sub-steps:

performing an intentional analysis on the query text in the natural language to determine a query intention of the query text in the natural language;

removing a text content that is not consistent with the query intention from the query text in the natural language;

converting the query text in the natural language following the removing step into the structured statement in the structured query statement.

That is to say, the true meaning of the query statement in a natural language provided by a user is determined by way of an intentional analysis, in other words, query intention. Subsequently, the content that is not consistent with the query intention will be removed from the query statement in a natural language, so as to obtain a structured query statement.

Next, step S601 and step S602 will be further described in detail with a simple example.

1, The system receives a query statement in a natural language entered by a user; the query statement is as follows: "singer(s) of height thereof is greater than 180 cm."

2, The system performs an intentional analysis for the query statement in a natural language to remove the word "of," so as to reach a structured query statement as follows "singer(s) height thereof is greater than 180 cm."

3, The system further converts the structured query statement obtained from an intentional analysis to obtain a number of identification words, and these identification words receive entity tags, so as to obtain: height, greater than, 180 cm and singer; at this stage, these four identification words can be directly used by the query system. As a result, the system can start to execute a query operation according these identification words.

4, The system generates a query statement, which is as follows: ATE(singer), (attr weight, ">60 kg"). The foregoing query statement will be further provided to the query system of the database in the form of preset codes, subsequently a corresponding query result will be obtained.

Thus, the information query method and device according to the present invention has been described in detail.

Further, according to the method of the present invention, a computer program product can also be obtained. The computer program product comprises a computer readable medium, and the computer readable medium storing a computer program for implementing the respective functions defined in the above method of the present invention. Those skilled in the art will also understand that the various illustrative logical blocks, modules, circuits, and algorithm steps described in this disclosure can be implemented as electronic hardware, computer software, or both.

The flow charts and block diagrams in the drawings show the possible architecture of the system, functions and operations that can be implemented according to the system and method of the various embodiments of the present invention. In this regard, each box in the flow charts or block diagrams can represent a part of a module, a block of program or a program code, wherein the part of a module, a block of program or a program code can comprise one or more executable instructions for implementing the logic functions specified in the present invention. It should also be noted that in some alternative implementations, the functions provided in the boxes can also be implemented in an order different from that disclosed in the drawings of the present application. For example, two consecutive blocks may actually be executed substantially concurrently. In some cases, they may also be performed in a reverse order, depending on the respective functions involved. It should also be noted that, each box or block in the block diagrams and/or flow charts, as well as the combinations of the boxes or blocks in the block diagrams and/or flow charts can be implemented by respective hardware based systems dedicated to implement the specified functions or operations, alternatively, they can be implemented by combination of dedicated hardware and computer instructions.

Various embodiments of the present invention have been described above. The foregoing description is an exemplary description, rather than an exhaustive description, and is not limited to the described embodiments. Without departing from the scope and principle of the embodiments of the present invention, many modifications and variations are obvious to those of ordinary skill in the art. The terms used in the present application are selected for the purpose of best understanding the principles, practical applications, improvement to the existing technology of the embodiments of the present invention, or for understanding the respective embodiments of the present invention by other persons of ordinary skill in the art.

The invention claimed is:

1. An information query method, comprising:
converting a query text in a natural language inputted by a user into a structured statement in an abstract query language;
converting the structured statement in the abstract query language into a basic query statement or multiple iterated basic query statements;
executing a query operation against a database structure and according to the basic query statement or the multiple iterated basic statements, wherein the database structure comprises an entity database and a category database, the category database comprises a plurality of entity category data and category tags, the plurality of entity category data are divided into a plurality of levels, comprising the entity category data in a low level subordinate to the entity category data associated therewith in a higher level, wherein an entry for an entity in the entity database comprises a meta-information field storing a category tag of the plurality of entity category tags corresponding to the entity category data for describing a category of the entity, wherein the entry further comprises a variable attribute field storing entity attribute data;

wherein the basic query statement or the multiple iterated basic statements comprises:
  an entity information query statement, which is used for querying entity information related to a designated entity;
  an entity attribute query statement, which is used for querying a designated attribute of the designated entity; and
  an entity reverse query statement, which is used for reversely querying a corresponding entity according to a designated attribute filtering condition and a designated category, wherein executing the entity reverse query statement comprises retrieving in the entity database the entry satisfying the following conditions:
    the category tag is a category tag corresponding to the entity category data representing the designated category or a category tag corresponding to the entity category data subordinate to the designated category; and
    the entity attribute data satisfies the designated attribute filtering condition; and
  when the designated attribute related to the designated attribute filtering condition belongs to the entity attribute data defined by the designated category, executing the query operation according to the entity reverse query statement.

2. The information query method according to claim 1, wherein the basic query statement comprises:
  a related entity query statement, which is used for querying an entity that has a designated relationship with the designated entity; and
  an entity relational query statement, which is used for querying a relationship between two designated entities.

3. The information query method according to claim 2, wherein the database structure comprises:
  the entity database, the entry for the entity in the entity database comprising an entity data field and the variable attribute field, wherein the entity data field stores the entity data representing the entity, and the variable attribute field stores the entity attribute data describing an entity's attribute; and
  a relational database, each entry in the relational database comprising two nodes and edge information, wherein the two nodes respectively store two entity data representing two entities, and the edge information stores the entity relational data of two entities.

4. The information query method according to claim 3, wherein the entry for the entity in the entity database further comprises a meta-information field, wherein the meta-information field stores the meta-information related to the entity, and the meta-information refers to the information distinguishing the entity from other entities, and wherein in the step of executing the query operation, the entity information is determined on the basis of the meta-information.

5. The information query method according to claim 4, wherein the category database stores, in association with each entity category data, an entity attribute defined by the entity category represented by the entity category data.

6. An information query device, comprising at least one processor and at least one memory including computer program instructions, the at least one memory and the computer program instructions, with the at least one processor, causing the information query device at least to perform operations comprising:
  converting a query text in a natural language inputted by a user into a structured statement in an abstract query language;
  converting the structured statement in the abstract query language into a basic query statement or multiple iterated basic query statements;
  executing a query operation against a database structure and according to the basic query statement or the multiple iterated basic statements, wherein the database structure comprises an entity database and a category database, the category database comprises a plurality of entity category data and category tags, the plurality of entity category data are divided into a plurality of levels, comprising the entity category data in a low level subordinate to the entity category data associated therewith in a higher level, wherein an entry for an entity in the entity database comprises a meta-information field storing a category tag of the plurality of entity category tags corresponding to the entity category data for describing a category of the entity, wherein the entry further comprises a variable attribute field storing entity attribute data;
  wherein the basic query statement or the multiple iterated basic statements comprises:
    an entity information query statement, which is used for querying entity information related to a designated entity;
    an entity attribute query statement, which is used for querying a designated attribute of the designated entity; and
    an entity reverse query statement, which is used for reversely querying a corresponding entity according to a designated attribute filtering condition and a designated category, wherein executing the entity reverse query statement comprises retrieving in the entity database the entry satisfying the following conditions:
    the category tag is a category tag corresponding to the entity category data representing the designated category or a category tag corresponding to the entity category data subordinate to the designated category; and
    the entity attribute data satisfies the designated attribute filtering condition; and
  when the designated attribute related to the designated attribute filtering condition belongs to the entity attribute data defined by the designated category, executing the query operation according to the entity reverse query statement.

7. The device according to claim 6, wherein the at least one memory and the computer program instructions, with the at least one processor, cause the device to perform operations comprising:
  executing the entity information query statement, so as to query the entity information related to the designated entity;
  executing the entity attribute query statement, so as to query the designated attribute of the designated entity;
  executing the entity reverse query statement, so as to reversely query the corresponding entity according to the designated attribute filtering condition and the designated category;
  executing a related entity query statement, so as to query an entity that has a designated relationship with the designated entity; and
  executing an entity relational query statement, so as to query a relationship between two designated entities.

8. The device according to claim 7, wherein the at least one memory and the computer program instructions, with the at least one processor, cause the device to perform operations comprising:
storing entity data representing the entity, and the variable attribute field storing the entity attribute data describing an entity's attribute;
storing meta-information related to the entity, and the meta-information refers to entity information distinguishing the entity from other entities, and determining the entity information on the basis of the meta-information;
storing two entity data representing two entities, and edge information associated with two nodes comprising entity relational data representing a relation between the two entities.

9. The device according to claim 8, wherein the at least one memory and the computer program instructions, with the at least one processor, cause the device to perform operations comprising:
storing in association with each entity category data, an entity attribute defined by the entity category represented by the entity category data.

10. An information query method, comprising:
performing an intentional analysis on a query text in a natural language inputted by a user, which is then converted into a structured query statement;
converting the query statement into a basic query statement or multiple iterated basic query statements;
executing a query operation against a database structure and according to the basic query statement or the multiple iterated basic statements, wherein the database structure comprises an entity database and a category database, the category database comprises a plurality of entity category data and category tags, the plurality of entity category data are divided into a plurality of levels, comprising the entity category data in a low level subordinate to the entity category data associated therewith in a higher level, wherein an entry for an entity in the entity database comprises a meta-information field storing a category tag of the plurality of entity category tags corresponding to the entity category data for describing a category of the entity, wherein the entry further comprises a variable attribute field storing entity attribute data, wherein the basic query statement or the multiple iterated basic statements comprises:
an entity information query statement, which is used for querying entity information related to a designated entity;
an entity attribute query statement, which is used for querying a designated attribute of the designated entity; and
an entity reverse query statement, which is used for reversely querying a corresponding entity according to a designated attribute filtering condition and a designated category, wherein executing the entity reverse query statement comprises retrieving in the entity database the entry satisfying the following conditions:
the category tag is a category tag corresponding to the entity category data representing the designated category or a category tag corresponding to the entity category data subordinate to the designated category; and
the entity attribute data satisfies the designated attribute filtering condition; and
when the designated attribute related to the designated attribute filtering condition belongs to the entity attribute data defined by the designated category, executing the query operation according to the entity reverse query statement.

11. The information query method according to claim 10, wherein the step of performing an intentional analysis on a query text in a natural language inputted by a user, which is then converted into a structured query statement, comprises:
performing an intentional analysis on the query text in the natural language to determine
a query intention of the query text in the natural language;
removing text content that is not consistent with the query intention from the query text in the natural language; and
converting the query text in the natural language following the removing step into the structured statement in the structured query statement.

12. The information query method according to claim 10, wherein the step of executing a query operation according to the basic query statement or the multiple iterated basic statements, comprises:
querying the designated attribute of the designated entity;
querying the information related to the designated entity;
reversely querying the corresponding entity according to the designated attribute filtering condition and the designated category;
querying an entity that has a designated relation with a designated entity; or
querying a relationship between two designated entities.

13. The information query method according to claim 10, wherein the step of executing a query operation according to the basic query statement or the multiple iterated basic statements, comprises:
in the entity database, using the basic query statement to query an entity data field and/or the variable attribute field, wherein the entity data field stores the entity data representing the entity, and the variable attribute field stores the entity attribute data describing the entity's attribute; and
in the relational database, using the basic query statement to query an entry, wherein each entry comprises two nodes and edge information, wherein the two nodes respectively store two entity data representing two entities, and the edge information stores the entity relational data of two entities.

14. The information query method according to claim 13, wherein the step of, in the entity database, using the basic query statement to query an entity data field and/or a variable attribute field, comprises:
in the entity database, using the basic query statement to query the meta-information field, wherein the meta-information field stores the meta-information related to the entity, and the meta-information refers to the information distinguishing the entity from other entities.

15. A computer program product comprising at least one non-transitory computer-readable storage medium having computer-executable program code portions stored therein, the computer-executable program code portions comprising program code instructions configured to:
convert the structured statement in the abstract query language into a basic query statement or multiple iterated basic query statements;
execute a query operation against a database structure and according to the basic query statement or the multiple iterated basic statements, wherein the database structure comprises an entity database and a category database, the category database comprises a plurality of entity category data and category tags, the plurality of entity category data are divided into a plurality of levels, comprising the entity category data in a low level subordinate to the entity category data associated therewith in a higher level, wherein an entry for an entity in the entity database comprises a meta-information field storing a category tag of the plurality of entity category tags corresponding to the entity category data for describing a category of the entity, wherein the entry further comprises a variable attribute field storing entity attribute data;

wherein the basic query statement or the multiple iterated basic statements comprises:

an entity information query statement, which is used for querying entity information related to a designated entity;

an entity attribute query statement, which is used for querying a designated attribute of the designated entity; and an entity reverse query statement, which is used for reversely querying a corresponding entity according to a designated attribute filtering condition and a designated category, wherein executing the entity reverse query statement comprises retrieving in the entity database the entry satisfying the following conditions:

the category tag is a category tag corresponding to the entity category data representing the designated category or a category tag corresponding to the entity category data subordinate to the designated category; and the entity attribute data satisfies the designated attribute filtering condition; and when the designated attribute related to the designated attribute filtering condition belongs to the entity attribute data defined by the designated category, executing the query operation according to the entity reverse query statement.

* * * * *